United States Patent [19]
Yoshida

[11] 4,414,658
[45] Nov. 8, 1983

[54] LINEAR TRACKING ARRANGEMENT IN A PHOTOGRAPHIC DISC TYPE INFORMATION CONTAINING SYSTEM

[75] Inventor: Glenn T. Yoshida, Cupertino, Calif.

[73] Assignee: McDonnell Douglas Corporation, Long Beach, Calif.

[21] Appl. No.: 273,235

[22] Filed: Jun. 12, 1981

[51] Int. Cl.³ .......................... G11B 7/00; G11B 21/10
[52] U.S. Cl. ...................................... 369/46; 250/202; 369/120
[58] Field of Search .................... 369/44, 45, 46, 118, 369/120, 275; 250/202

[56] References Cited

U.S. PATENT DOCUMENTS

| | | | |
|---|---|---|---|
| 3,913,076 | 10/1975 | Lehureau et al. | 369/46 X |
| 3,962,721 | 6/1976 | de Haan | 369/46 X |
| 4,051,527 | 9/1977 | Braat | 369/46 X |
| 4,057,833 | 11/1977 | Braat | 369/46 |
| 4,163,149 | 7/1979 | Sawano et al. | 369/45 X |

*Primary Examiner*—Bernard Konick
*Assistant Examiner*—Donald McElheny, Jr.
*Attorney, Agent, or Firm*—Flehr, Hohbach, Test, Albritton & Herbert

[57] ABSTRACT

An optical system for recording information on or retrieving information from a rotating disc is disclosed herein. In this system a beam of light located on one side of the disc is directed onto and laterally across a given track of the disc. The track serves to contain the recorded information and, ignoring this information, is characterized by a predetermined light transmissivity curve in its cross-direction. An arrangement for maintaining the beam and given track in a fixed lateral position relative to one another as the disc rotates, even if the track moves laterally to a limited extent from its intended path of movement, is also disclosed herein. This position maintaining arrangement utilizes circuitry including light sensitive means, specifically two light detectors having trapezoidal light sensitive surfaces, disposed in optical alignment with the beam on an opposite side of the disc and responsive to the light passing through the disc from the beam for producing an electrical error signal corresponding in time to and substantially linearly in magnitude with limited lateral deviations of the given track from its intended position with respect to the light beam, this linear relationship resulting from the configurations of the light sensitive surfaces. The error signal is in turn utilized to vary the position of the initial beam for minimizing the lateral deviations relative to the beam.

3 Claims, 10 Drawing Figures

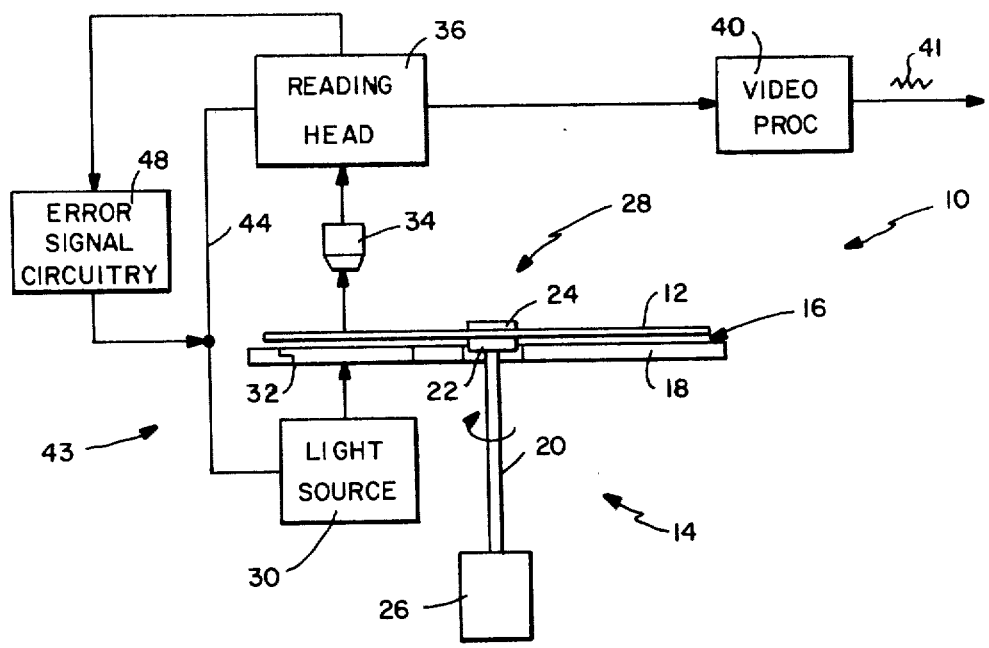
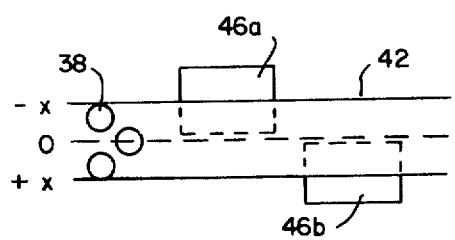
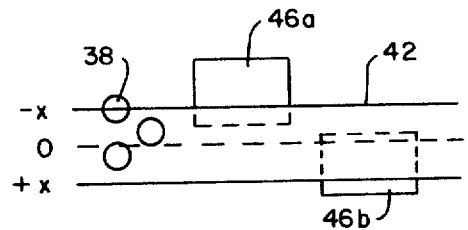
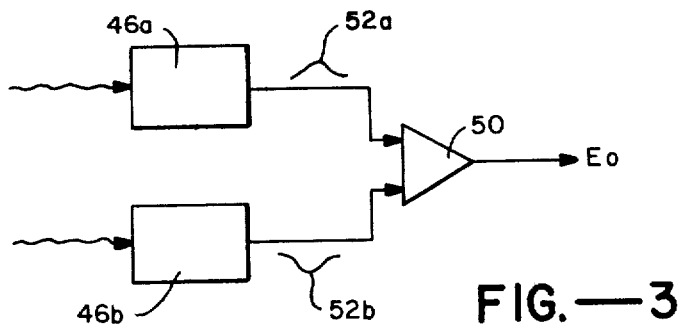
FIG.—1
FIG.—2a
FIG.—2b
FIG.—3

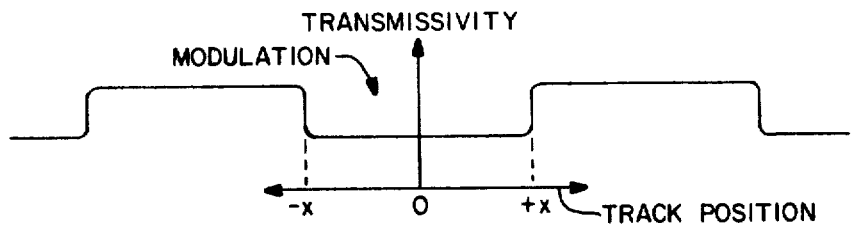
FIG.—4
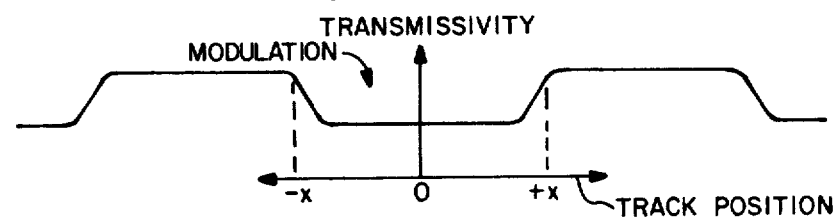
FIG.—5
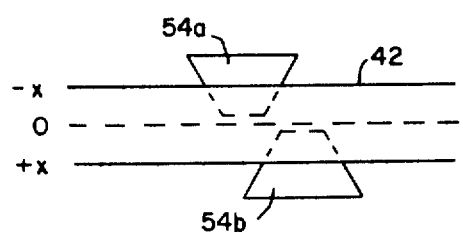
FIG.—6
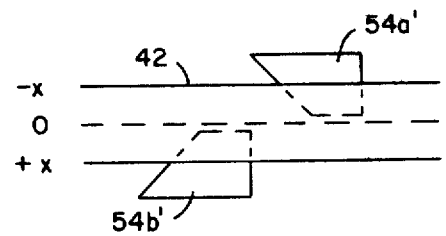
FIG.—7
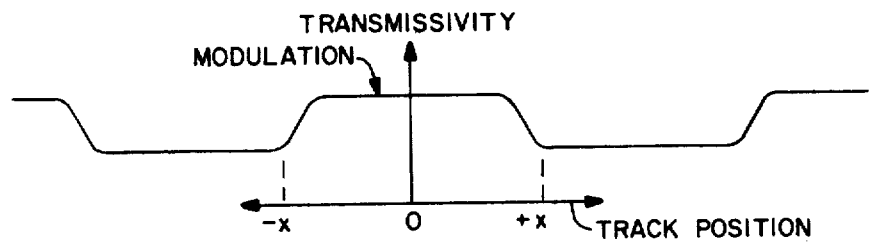
FIG.—8
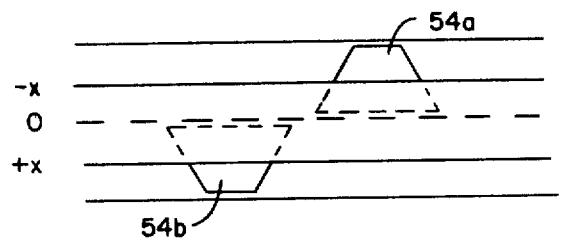
FIG.—9

LINEAR TRACKING ARRANGEMENT IN A PHOTOGRAPHIC DISC TYPE INFORMATION CONTAINING SYSTEM

The present invention relates generally to an optical system for recording information onto and/or retrieving information from a rotating photographic disc in which a beam of light located on one side of the disc is directed onto and laterally across a given track of the disc. This invention is directed more particularly to a tracking arrangement associated with such a system, specifically an arrangement for maintaining the beam and information bearing track in a fixed lateral position relative to one another as the disc rotates, even if the track moves laterally to a limited extent from its intended path of movement.

There are presently many different ways of recording information on and retrieving it from different types of media including, for example, magnetic tapes and discs. However, as will be seen hereinafter, the present invention is particularly suitable for use in a system for recording information photographically on a rotating disc and for retrieving information therefrom. A system of this general type is disclosed in the October 1976 NAVY TECHNICAL INFORMATION PRESENTATION PROGRAM (NTIPP) publication entitled PHOTOGRAPHIC VIDEO DISC TECHNOLOGY ASSESSMENT REPORT prepared by Poe Engineering Service (Contract No. N00600-76-C-0505) and reference is made thereto.

The specific overall storage/retrieval system contemplated herein utilizes a rotating disc containing either concentric or spiral tracks which photographically contain the intended information lengthwise along the tracks. The intended information is photographically written onto a given concentric track or a section of a continuous spiral track by means of an appropriately modulated beam of light which is directed onto the track or track section as the disc rotates. The same information can be retrieved by reversing this procedure, that is, by directing an unmodulated beam of light through the information bearing track or track section as the disc rotates so as to reproduce the appropriately modulated beam. It should be apparent that either of these procedures requires that the initiating beam and the moving track be maintained in a fixed lateral position relative to one another as the disc rotates, even if the track deviates laterally from its intended path of movement which can happen if, for example, the disc itself is out of round.

One proposed way of maintaining the positional relationship just recited is to place a pair of light detectors on the opposite side of the information bearing track or track section as the incoming beam but in fixed optical alignment with the latter. These light detecting devices are interconnected into an overall electrical circuit which is designed to produce an electrical error signal in response to the light passing through the disc and onto the detectors from the incoming beam. The error signal is intended to correspond in time and magnitude to lateral deviations of the track or track section being monitored from its intended lateral position with respect to the incoming light beam. This error signal is then used in a servo type of electromechanical network to readjust the position of the incoming beam and therefore the light detectors in order to compensate for the lateral track deviations.

The particular method of producing a suitable error signal just recited presupposes that the cross-directional transmissivity of the track or track section being monitored (hereinafter merely referred to as "track") is different than the light transmissivity on either side of the track, that is, ignoring any information contained on the track. Under ideal conditions, the cross-directional transmissivity of the track from one edge to its other edge is uniform and less than the transmissivity between tracks. Thus, the two light detectors can be initially positioned in the same straddling relationships with opposite sides of the track being monitored when the track is in its intended lateral position. In this way, each light sensing device detects the same amount of light as the other and, hence, under these conditions, both produce identical output signals which can be subsequently differentiated for producing a zero error signal. In this latter regard, it should be noted that differences in transmissivity lengthwise along the track caused by information components thereon can be ignored because the difference of the two detected signals is used for the error signal. There is a slight phase shift difference of the two detected signals which is dependent on disc radius, distance between the two detectors, and the disc rotating speed. This phase shift or time delay is small or short and a phase shift network can be used to eliminate it.

Should the track being monitored deviate laterally towards one light detector and away from the other, one will detect more light and the other less for producing different output signals and hence a positive (or negative) error signal. Under ideal conditions, that is, when the cross-directional transmissivity of the track being monitored is uniform and if the light sensitive surfaces of the light detectors are square or rectangular, the ultimately produced error signal will be linearly proportionate to any track deviations, of course to a limited extent since the tracking arrangement is not intended to compensate for extreme deviations, for example where the track being monitored deviates laterally entirely beyond the incoming beam and associated detectors.

Unfortunately, in some information storage and retrieval systems of the type described, the cross-directional transmissivity of the information bearing tracks is not uniform. For example, in one such system, the cross-directional transmissivity (again ignoring the actual information on the track) is somewhat sinusoidal. Therefore, the use of square or rectangular light detectors results in the production of a non-linear error signal.

It is therefore a primary object of the present invention to provide a tracking arrangement which takes the cross-directional transmissivity of the tracks being monitored into account and in so doing provides a linear error signal even if the cross-directional transmissivity is not uniform.

A more particular object of the present invention is to provide a tracking arrangement which utilizes two light detectors as described above and specifically detectors having light sensitive surfaces which are configured in accordance with and dependent on the non-uniform cross-directional transmissivity of the tracks being monitored such that the output signals from both detectors when combined produce an error signal which is linearly dependent upon track deviations.

The overall information retrieval system including a linear tracking arrangement designed in accordance with the present invention will be described in more detail hereinafter in conjunction with the drawings wherein:

FIG. 1 is a partial block diagram and partial schematic illustration of the retrieval system disclosed herein, specifically one in which information stored photographically on a rotating disc is optically retrieved by causing the stored information to modulate a light beam directed onto the disc;

FIGS. 2a and 2b diagrammatically illustrate the way in which tracking errors result in a system of the type illustrated in FIG. 1;

FIG. 3 schematically illustrates an opto-electrical circuit for producing an electronic error signal corresponding in time and magnitude to the tracking errors in the system of FIG. 1;

FIG. 4 graphically illustrates an ideal, uniform cross-directional light transmissivity curve characteristic of an ideal track on a disc utilized to store information in a system of the type illustrated in FIG. 1, ignoring transmissivity changes in the lengthwise direction of the track;

FIG. 5 is a graphic illustration similar to FIG. 4 but illustrates a non-uniform light transmissivity curve characteristic of an actual information bearing disc;

FIG. 6 diagrammatically illustrates a pair of light detectors which form part of the tracking arrangement of the present invention and which are configured in accordance with and dependent on the cross-sectional transmissivity curve of FIG. 5 to provide a linear error signal;

FIG. 7 is a view similar to FIG. 6 but illustrating detectors displaying a different configuration;

FIG. 8 is a view similar to FIG. 5 but illustrating a different transmissivity curve; and FIG. 9 is a view similar to FIG. 6 but illustrating a track corresponding to the transmissivity curve of FIG. 8 and differently oriented detectors.

Turning now to the drawings, attention is first directed to FIG. 1 which illustrates the system 10 for retrieving information which has been recorded photographically on one or more annular tracks of an approriate disc 12. The information stored can be analog or digital and, in an actual embodiment, corresponds to a video signal sufficient to drive a television monitor (including a standard home television set). As illustrated in FIG. 1, system 10 includes a suitable arrangement generally indicated at 14 which supports disc 12 for rotation about a fixed axis in order to cause its track or tracks to repeatedly move along their respective paths. In the specific embodiment shown, disc 12 is rotatably supported on an air bearing 16 above a stationary table 18 and arrangement 14 includes a spindle 20 having a radial flange 22 and a hub 24 between which the disc is clamped. This spindle is driven by a motor 26.

In addition to arrangement 14, overall system 10 includes an information sensing arrangement generally indicated at 28 for producing an electronic information bearing signal. This signal corresponds to the information stored in any given track on disc 12 when the disc is rotated and so long as the sensing arrangement and moving track are maintained in predetermined, fixed lateral alignment with one another, that is, so long as the moving track does not deviate laterally from this relative position. The track and sensing arrangement must also be maintained in fixed spatial alignment with one another by suitable means. However, this latter means does not form part of the present invention and, hence, will not be discussed herein. In the particular embodiment illustrated, the electronic information bearing signal produced is a video signal which meets NTSC standards and, hence, includes luminance, chroma, synchronization and audio components. This signal is used to drive a monitor (not shown) for reproducing visually and through sound the information stored on disc 12.

In order to retrieve the information stored on disc 12, arrangement 28 includes a light source 30 positioned beneath a radial slot 32 in table 18. In a preferred embodiment, the light source comprises an incandescent lamp and a condenser but any suitable light source, including a laser, can be employed. Arrangement 28 also includes an objective lens 34 and reading head 36 which together with the light source and other optical means, if needed, are positioned relative to arrangement 14 so that light passes from the source through the table and thereafter through the given track being read during rotation of the track so that the light is modulated in intensity by the information recorded on the track. The modulated light thereafter passes onto the lens 34 which, in turn, projects the magnified image from the given track onto reading head 36. The reading head 36 includes one or more sensing elements 38 (see FIG. 2), for example photodiodes, which cooperate with video processing circuitry 40 for producing a video output signal generally indicated at 41. Inasmuch as the light source 30, objective lens 34, the sensing elements 38 forming part of the reading head and the video processing circuitry 40 may be readily provided and do not by themselves form the present invention, a more detailed description thereof will not be necessary.

In order to retrieve the information on disc 12 in as reliable a form as possible, it is necessary to maintain sensing arrangement 28 and the given track being read in a predetermined fixed lateral position relative to one another, as stated above. More specifically, the light from source 30 and the associated sensing elements 38 in reading head 36 must be maintained in fixed alignment with the given track being read. This is best exemplified in FIG. 2a where the sensing elements 38 are shown in an appropriately aligned position centrally between the sides of a given track 42. Unfortunately, because of track deviations, the sensing elements do not always remain in their proper positions relative to the track being read. This is best exemplified in FIG. 2b which illustrates track 42 in a position slightly to one side of its intended position. The track also has the tendency to shift in the other direction. If left uncorrected, these deviations would result in serious distortion to the ultimately produced information bearing signal. However, system 10 contains a tracking arrangement 43 including suitable means to be discussed below for producing an electronic error signal corresponding in time and magnitude to the tracking deviations and a servo mechanism responsive to the error signal and acting on arrangement 28 and specifically the combined position of the light beam from source 30 and the reading head 36 in order to compensate for these deviations and maintain the incoming light beam and the track being read in the appropriate lateral position relative to one another.

In the overall system illustrated in FIG. 1, the servo mechanism itself is generally indicated by the interconnecting line 44 and is responsive to the ultimately produced error signal. The error signal is one which includes, for example, positive going components which correspond in time and magnitude to lateral tracking deviations in one direction and negative going components which correspond in time and magnitude to lateral tracking deviations in the opposite direction. In order to provide this signal, tracking arrangement 43 includes a pair of light sensing elements or detectors 46a and 46b, for example photodiodes, or other suitable means and associated circuitry 48 (see FIG. 1) including specifically a differentiating circuit, e.g. a differential amplifier 50 (see FIG. 3).

In the particular embodiment illustrated in FIG. 2a, the two detectors 46a, 46b have rectangular light sensing surfaces. With the track 42 in its intended position in proper lateral alignment with the incoming light beam, the light sensitive surface of detector 46a straddles one side of track 42 and the light sensitive surface of detector 46b straddles the opposite side in an identical manner. In this way, a certain amount of light passing through disc 12 both within and just outside track 42 is detected by detector 46a and the same amount of light is detected by detector 46b. As a result, the detectors 46a, 46b produce equivalent output signals which are generally indicated at 52a, 52b in FIG. 3. These two signals are applied to differential amplifier 50 which produces its own output signal corresponding to the difference, that is, error signal $E_o$. Since the two incoming signals 52a, 52b are equivalent, the error signal is zero.

Referring to FIG. 2b, should the track 42 deviate laterally from its intended position relative to the incoming light beam, one of the detectors, for example detector 46a will be disposed further outside the track than the other detector, for example detector 46b, which extends further into the track. Since the light transmissivity of the track in its cross-direction is typically lower than the light transmissivity between tracks, in the situation illustrated in FIG. 2b, detector 46a will receive more light than detector 46b. This will in turn cause signal 52a to be greater than signal 52b which, in turn, will result in a positive (or negative) error signal $E_o$. The linearity or non-linearity of this error signal with respect to the magnitude of deviation of track 42 depends both on the transmissivity of the given track in its cross-direction and the configuration of the light sensitive surface of each detector 46a, 46b. More specifically, in the case where the cross-sectional transmissivity of the track is uniform as illustrated in FIG. 4 and the light sensitive surfaces of detectors 46a, 46b are rectangular (or square) and identical to one another, the resultant error signal $E_o$ will be linearly dependent upon the degree or magnitude of deviation of track 42, to a limited extent. This linear relationship will only follow so long as the deviation is not so great that one of the detectors extends into an adjacent track. In this regard, it is assumed that the transmissivity between tracks is uniform throughout.

A departure from any of the conditions just recited will destroy the linearity of error signal $E_o$. In other words, if the cross-sectional transmissivity of the track being read is not uniform but the light sensitive surfaces of the detectors 46a, 46b remain rectangular or square, the error signal will not be linear. In addition, if the transmissivity of the disc between tracks is not uniform, the utilization of a track having the cross-directional transmissivity curve of FIG. 4 and rectangular detectors will not necessarily result in a linear error signal.

Referring specifically to FIG. 5, the cross-directional transmissivity curve of the tracks of a disc forming part of an actual working embodiment of system 10 as illustrated. From this curve, it should be apparent that the light transmissivity of the track decreases rather rapidly along relatively short distances inward from the opposite edges of the track and then becomes somewhat uniform, as indicated by the solid line curve. In actuality, this solid line curve is a trapezoidal approximation of a somewhat sinusoidal variation in the transmissivity as indicated by dotted lines. If rectangular detectors of the type illustrated in FIG. 2 are used in conjunction with a track characterized by this particular cross-directional transmissivity curve, the error signal $E_o$ would not be linear. In order to linearize this error signal, the light sensitive surfaces of the detectors used must be configured such that the amount of increase in light detected by one is identical to the decrease detected by the other for any given lateral deviation in track 42, thereby resulting in a differential signal, e.g. error signal $E_o$, which is linear. In the case of the somewhat trapezoidal transmissivity curve illustrated in FIG. 4, the detectors should be somewhat trapezoidal, as indicated in FIG. 6. These detectors which are generally designated by the reference numerals 54a and 54b are shown in position relative to track 42 when the latter is in its intended position. Under these circumstances, the same amount of light impinges each detector and hence the error signal is zero. Should the track move downward as in FIG. 2b, the increase in light impinging detector 54a will be approximately equal to the decrease in light impinging detector 54b, notwithstanding the fact that the cross-directional transmissivity curve of the track is not uniform. The reason for this is the particular trapezoidal configuration of each detector.

It should be apparent from the foregoing that the purpose of the present invention is to provide a linear error signal $E_o$ whether or not the cross-sectional transmissivity of the associated track is uniform or not and regardless of how the transmissivity varies so long as the variation is constant along the entire track. This is accomplished by designing the detectors to take the cross-directional transmissivity into account. In this regard, it is to be understood that the present invention is not limited to detectors of specific configuration such as the rectangular shape illustrated in FIGS. 2a and 2b or the trapezoidal shape illustrated in FIG. 6. The particular shape will be dictated by the cross-directional transmissivity of the track or tracks in question so as to provide a linear error signal. Moreover, the present invention is not limited to a system for retrieving information from a disc but can be utilized in writing information onto a blank track where it is just as important to maintain a proper lateral tracking relationship between the incoming modulated beam and the track receiving the information.

The detectors can have the shape shown in FIG. 7 (indicated at 54a' and 54b') and still provide the same detected output as the trapezoidal detectors. If the detectors 54a, 54b are associated with a track 42' such that its cross-directional transmissivity is as shown in FIG. 8, the detectors 54a, 54b would be in the orientation as shown in FIG. 9. The larger area side of the detector is oriented toward the maximum transmissivity or for a larger detected signal. In this way, the largest error signal and therefore, best signal to noise is obtained.

What is claimed is:

1. In an optical system for recording information on or retrieving information from a rotating disc in which a beam of light located on one side of said disc is directed onto and across a given track of said disc, which track serves to contain said information and which, ignoring said information, is characterized by a predetermined non-uniform light transmissivity curve in its cross-direction, an arrangement for maintaining said beam and track in a fixed lateral position relative to one another as said disc rotates, even if said track moves laterally from its intended path of movement to a limited extent, said arrangement comprising circuitry including light sensitive means disposed in optical alignment with said beam on an opposite side of said disc and responsive to the light passing through said disc for producing an electrical error signal corresponding in time and substantially linearly in magnitude with limited lateral deviations of said track from its intended lateral position with respect to said light beam, said light sensitive means being configured in accordance with said curve to maintain a linear relationship between the magnitude of said error signal and said lateral track deviations, regardless of the non-uniform cross-directional transmissivity of said track; and means responsive to said error signal and acting on said beam for minimizing said deviations.

2. In an optical system for recording information on or retrieving information from a rotating disc in which a beam of light located on one side of said disc is directed onto and across a given track of said disc, which track serves to contain said information and which, ignoring said information, is characterized by a predetermined non-uniform light transmissivity curve in its cross-direction, an arrangement for maintaining said beam and track in a fixed lateral position relative to one another as said disc rotates, even if said track moves laterally from its intended path of movement to a limited extent, said arrangement comprising circuitry including light sensitive means disposed in optical alignment with said beam on an opposite side of said disc and responsive to the light passing through said disc for producing an electrical error signal corresponding in time and substantially linearly in magnitude with limited lateral deviations of said track from its intended lateral position with respect to said light beam, said light sensitive means including two light detecting devices having identically configured light sensitive surfaces in optical alignment with said beam, said surfaces being positioned so as to be adjacent to and on opposite sides of a center line through said track when said error signal is zero, each of said devices producing its own electrical output signal in response to the light which passes through said disc and which is detected by its light sensitive surface, each of said surfaces being configured such that its output signal is linearly proportionate to said deviations, said circuitry including means for comparing said output signals and producing said error signal in response thereto; and means responsive to said error signal and acting on said beam for minimizing said deviations.

3. In an optical system for recording information on or retrieving information from a rotating disc in which a beam of light located on one side of said disc is directed onto and across a given track of said disc, which track serves to contain said information and which, ignoring said information, is characterized by a predetermined non-uniform light transmissivity curve in its cross-direction, an arrangement for maintaining said beam and track in a fixed lateral position relative to one another as said disc rotates, even if said track moves laterally from its intended path of movement to a limited extent, said arrangement comprising circuitry including light sensitive means disposed in optical alignment with said beam on an opposite side of said disc and responsive to the light passing through said disc for producing an electrical error signal corresponding in time and substantially linearly in magnitude with limited lateral deviations of said track from its intended lateral position with respect to said light beam, said light sensitive means including two light detecting devices having identically configured light sensitive surfaces, trapezoidal in shape, in optical alignment with said beam, said surfaces being positioned so as to be adjacent to and an opposite sides of a center line through said track when said error signal is zero; and means responsive to said error signal and acting on said beam for minimizing said deviations.

* * * * *